(12) United States Patent
Smith et al.

(10) Patent No.: US 9,316,756 B2
(45) Date of Patent: Apr. 19, 2016

(54) SYSTEM AND METHOD OF A RESERVOIR MONITORING SYSTEM

(75) Inventors: Aaron B. Smith, Austin, TX (US); D. Richard Metzbower, Austin, TX (US)

(73) Assignee: PGS GEOPHYSICAL AS, Oslo (NO)

( * ) Notice: Subject to any disclaimer, the term of this patent is extended or adjusted under 35 U.S.C. 154(b) by 624 days.

(21) Appl. No.: 13/568,773

(22) Filed: Aug. 7, 2012

(65) Prior Publication Data
US 2014/0046599 A1    Feb. 13, 2014

(51) Int. Cl.
| | |
|---|---|
| E21B 41/00 | (2006.01) |
| E21B 47/001 | (2012.01) |
| G01V 1/38 | (2006.01) |
| G01V 1/22 | (2006.01) |
| E21B 47/00 | (2012.01) |

(52) U.S. Cl.
CPC .............. *G01V 1/22* (2013.01); *E21B 41/0007* (2013.01); *E21B 47/0001* (2013.01); *G01V 1/3852* (2013.01); *G01V 2210/6122* (2013.01)

(58) Field of Classification Search
CPC ... E21B 41/0007; E21B 41/08; E21B 43/013; E21B 47/0001; G01V 1/22; G01V 1/3852
USPC ........ 166/360, 336, 338, 341, 250.01; 702/14
See application file for complete search history.

(56) References Cited

U.S. PATENT DOCUMENTS

| | | | | |
|---|---|---|---|---|
| 4,625,805 | A * | 12/1986 | Ladecky ....................... | 166/341 |
| 4,661,017 | A * | 4/1987 | Wood et al. .................... | 405/169 |
| 5,255,744 | A * | 10/1993 | Silva ............................. | 166/347 |
| 5,265,980 | A * | 11/1993 | Lugo .................. | E21B 33/0355 |
| | | | | 166/347 |
| 5,742,559 | A | 4/1998 | Marschall et al. | |
| 6,223,675 | B1 * | 5/2001 | Watt et al. ...................... | 114/312 |
| 6,510,270 | B1 * | 1/2003 | Toth et al. ...................... | 385/129 |
| 6,588,980 | B2 * | 7/2003 | Worman et al. ............... | 405/158 |
| 6,992,951 | B2 * | 1/2006 | O'Brien et al. ................. | 367/15 |
| 7,585,179 | B2 * | 9/2009 | Roberts .................. | G01V 1/201 |
| | | | | 439/451 |
| 8,100,182 | B2 * | 1/2012 | Smith .................... | E21B 17/017 |
| | | | | 166/339 |
| 8,840,340 | B2 * | 9/2014 | Eisenhower et al. ......... | 405/166 |
| 2005/0276665 | A1 * | 12/2005 | Entralgo et al. ............. | 405/190 |
| 2009/0009931 | A1 * | 1/2009 | Rocke ........................... | 361/602 |
| 2010/0252269 | A1 * | 10/2010 | Legrand ........................ | 166/336 |

(Continued)

FOREIGN PATENT DOCUMENTS

| | | |
|---|---|---|
| GB | 2449941 | 10/2008 |
| GB | 2470784 | 12/2010 |
| GB | 2478915 | 9/2011 |

(Continued)

OTHER PUBLICATIONS

United Kingdom Patent Application No. 1312769.1 Search Report dated Jan. 14, 2014.

(Continued)

*Primary Examiner* — Matthew R Buck

(57) ABSTRACT

Reservoir monitoring system. At least some of the illustrative embodiments are methods comprising installing a hydrocarbon reservoir monitoring system in a marine environment. The installing may be by: placing a base unit at the sea floor, the base unit communicatively coupled to a computer system at the surface, the communicative coupling by way of an umbilical cable; mechanically coupling a first termination module to the base unit, the termination module coupled to a first sensor cable; and communicatively coupling the first sensor cable to the umbilical cable.

26 Claims, 10 Drawing Sheets

(56) References Cited

U.S. PATENT DOCUMENTS

2011/0247825 A1* 10/2011 Batho et al. .................. 166/335
2012/0168168 A1* 7/2012 Cruden ......................... 166/338

FOREIGN PATENT DOCUMENTS

| GB | 2488841 | 9/2012 |
| WO | 9317354 | 9/1993 |
| WO | 2009023071 | 2/2009 |
| WO | WO 2011117561 A1 * | 9/2011 |
| WO | WO 2012123698 A1 * | 9/2012 |

OTHER PUBLICATIONS

United Kingdom Patent Application No. 1312769.1 Search Report dated Sep. 12, 2014.

* cited by examiner

SYSTEM AND METHOD OF A RESERVOIR MONITORING SYSTEM

BACKGROUND

Permanent hydrocarbon reservoir monitoring is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional (4D) seismic.

Marine-based permanent reservoir monitoring faces significant challenges that are not faced by land-based permanent monitoring systems. This is particularly true of ocean bottom installations as water depths extend into the 1000 meter range and beyond.

BRIEF DESCRIPTION OF THE DRAWINGS

For a detailed description of exemplary embodiments, reference will now be made to the accompanying drawings in which.

NOTATION AND NOMENCLATURE

Figure 1:
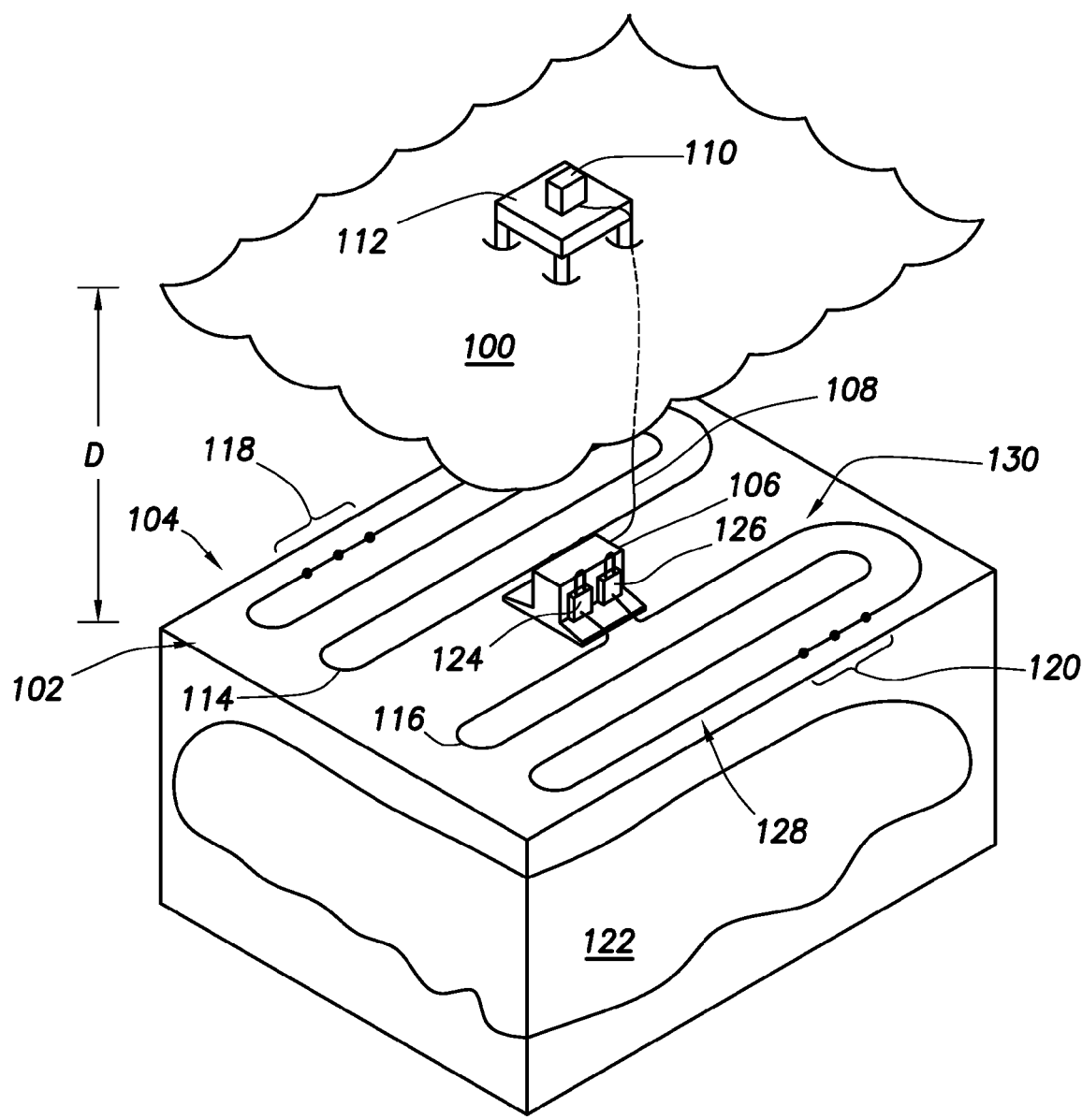
FIG. 1 shows a perspective cut-away view of a hydrocarbon reservoir monitoring system in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Releasably coupled" shall mean that a first device mechanically couples to a second device in such a way that the first device can be mechanically detached from the second device without damage to or disassembly of either device or intermediate devices. Devices coupled such that detachment requires cutting, breaking, deforming, removal of fasteners (e.g., bolts, screws, and rivets), damaging, or disassembly shall not be considered to be releasably coupled.

"Releasable optical coupler" shall mean an optical communicative coupling system comprising a first connector portion and a second connector portion mechanically and communicatively coupled in such a way that the first connector portion can be mechanically and optically de-coupled from the second connector portion without damage to or disassembly of either connector portion. Connector portions coupled such that detachment requires cutting, breaking, damaging, or disassembly shall not be considered a releasable optical coupler.

"Marine environment" shall mean an underwater location regardless of the salinity of the water. Thus, even an underwater location in a body of fresh water shall be considered a marine environment.

"Sea floor" shall mean the boundary of a body of water and the underlying sediment or rock. The term sea floor shall not imply anything regarding the salinity of the water, and thus even the boundary of a body of fresh water and the underlying sediment or rock shall be considered a sea floor.

"Surface" in relation to the location of a physical object shall mean any location 100 feet below mean sea level and above.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

The various example systems and methods are directed to permanent hydrocarbon reservoir monitoring systems used in marine environments (e.g., in the range of 1000 meters of water depth). Permanent in this context indicating that the example systems can be used in reservoir monitoring where the various devices for monitoring are left on the sea floor indefinitely; however, the example systems can be used in any reservoir monitoring context. More particularly still, at least some of the various embodiments are directed to optical-based permanent reservoir monitoring in marine environments. The specification first turns to illustrative systems to orient the reader, and then to specifics regarding installation and use of the example systems.

FIG. 1 shows a perspective cut-away view of a portion of a marine environment comprising a permanent reservoir monitoring system in accordance with at least some embodiments. In particular, FIG. 1 shows the surface 100 of the water. At a distance D below the surface 100 resides the sea floor 102, and below the sea floor 102 resides a hydrocarbon reservoir 122. In some locations the precise depth of the sea floor 102 is easily discernible, such as in locations where the sea floor is defined by a rock layer. In other locations, the sea floor 102 may be defined by a layer of silt, sand, mud, and/or organic material that has increasing density with increase depth, starting from a density approximately the same as the surrounding water. Thus, the precise depth where the sea floor 102 begins may be harder to quantify in some cases, and may also be a factor in the design of portions of the systems, as discussed more below.

Within the environment of FIG. 1 resides an example reservoir monitoring system 104. In some cases, reservoir monitoring system 104 is installed and remains in place for an extended period of time, and thus may be considered a "permanent" reservoir monitoring system. The example reservoir monitoring system 104 comprises a base unit 106 installed on the sea floor 102. The base unit mechanically and communicatively couples to an umbilical cable 108 that extends from the base unit 106 to a computer system at the surface. In the example system of FIG. 1, the computer system 110 may reside on a vessel 112 floating on the surface 100. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables discussed more below, are communicatively coupled to the computer system 110.

A reservoir monitoring system may comprise at least one sensor cable, and in the example system of FIG. 1 the reservoir monitoring system 104 comprises two sensor cables 114 and 116. In the system of FIG. 1, each sensor cable 114, 116 mechanically and communicatively couples to the base unit 106 on each end for redundancy of communication, in case of a communicative break along the sensor cable. Example systems to implement such redundant communication are discussed more below. The length of the sensor cables 114, 116 may vary depending upon the particular situation, and the length of sensor cables coupled to a base unit need not be the same. For example, in one situation a loop of sensor cable (e.g., sensor cable 114) may be on the order of 19 kilometers (km) in length, while another loop of sensor cable (e.g., sensor cable 116) may be on the order of 50 km.

The location of the base unit 106, as well as the sensor cables, may be in relation to the hydrocarbon bearing reservoir 122 (shown in partial cut-away view) that resides below the sea floor 102. While the reservoir monitoring system is shown to reside directly above the illustrative hydrocarbon bearing reservoir, in other cases the reservoir monitoring system 104 may be positioned at other locations in relation to a seismic source (not specifically shown) and the reservoir 122. For example, the hydrocarbon bearing reservoir 122 may reside beneath a man-made or geologic anomaly through which seismic signals are unduly attenuated and/or reflected, and thus the reservoir monitoring system 104 and the seismic source may straddle a reservoir to "shoot" under the anomaly to enable the monitoring of the reservoir 122.

Each sensor cable 114, 116 may comprise a plurality of seismic measurement devices, such as devices 118 associated with sensor cable 114, and sensor devices 120 associated with sensor cable 116. While only three devices 118 are shown associated with sensor cable 114, in practice many hundreds or thousands of such devices may be spaced along the sensor cable 114. Likewise, while only three devices 120 are shown associated with sensor cable 114, in practice many hundreds or thousands of such devices may be placed along the sensor cable 116. The devices 118 and 120 need not, however, be evenly spaced along the sensor cables 114 or 116, and extended portions of the sensor cables may be without seismic devices. For example, lead-in portions of the sensor cable may have long expanses (e.g., multiple kilometers) within which no seismic devices are located.

The embodiments illustrated and discussed in the current specification herein developed in the context of an optical system—with no electrical current flowing along the umbilical cable 108 and/or the sensor cables 114, 116. Persons having ordinary skill will understand that the invention described and claimed is not limited to optical-only systems, and electrical systems as well as mixed optical and electrical systems may be implemented in conformance with aspects of this disclosure.

The seismic devices may take any suitable form. For example, the seismic devices may be single-axis geophones, which measure minute changes in velocity. In some cases, the single-axis geophones may be gimbaled such that the geophones measure only vertical (i.e., aligned with the force of gravity) changes in velocity. In yet still other cases, the geophones may be three-axis geophones, which measure changes in velocity in all three spatial dimensions. In other cases, the seismic devices may be hydrophones which measure pressure or sound. In still other cases, multiple different kinds of seismic devices may be used in the same cable, including hydrophones and geophones. In some cases, the geophones and/or hydrophones may be optical devices, meaning the geophones and/or hydrophones are powered by optical energy conveyed along one or more optical fibers, and likewise modulate recorded data in the form of light along the same or different optical fibers.

In the illustrative embodiments of FIG. 1, each sensor cable 114 and 116 mechanically and communicatively couples to the base unit 106 by way of at least one termination module. For example, in FIG. 1 sensor cable 116 couples to the base unit 106 by way of a head termination module 124 and a tail termination module 126. The designation as "head" or "tail" is arbitrary. Example sensor cable 114 likewise couples to the base unit by way of termination modules, but the termination modules for sensor cable 114 are not visible in FIG. 1.

Each termination module may be selectively coupled and decoupled from the base unit. That is, coupling the tail termination module 126 both mechanically and communicatively couples the end of the sensor cable 116 to the base unit 106. Likewise, decoupling the tail termination module 126 both mechanically and communicatively decouples the end of the sensor cable 116 from the base unit 106. For this reason, the termination modules may be referred to as releasably coupled to the base unit. Mechanically coupling and decoupling the termination modules from the base unit, as well communicatively coupling and decoupling the termination modules, is discussed in greater detail below.

Advantages gained by providing a permanent reservoir monitoring system utilizing releasably coupled termination modules are numerous. For example, during initial installation, the tasks of setting and running the umbilical cable 108 may be separate and apart from installation of the sensor cables. In fact, depending on the initial design of the permanent reservoir monitoring system, sensors cables may be added much later, or later removed if needed. Moreover, releasable optical couplers suitable for use in marine environments are not designed to carry significant mechanical stresses; however, sensor cables are subject to having tension forces applied thereon, such as during installation or when a sensor cable is snagged by other marine equipment (e.g., a ship's anchor, fishing gear). Thus, the example termination modules 124, 126 may act to isolate the mechanical forces that may be applied to the sensor cables from the releasable optical couplers at the location of the base unit 106.

Further still, having the sensor cables coupled to the base unit by way of the termination modules enables certain repair strategies. Consider, for purposes of discussion, a cable break occurring at a middle of the sensor cable 116, such as at point 128. With a break at break point 128, repair may be completed by lifting the two portions of the cable at the break point to the surface, and performing the repair (such as by way of dedicated repair vessel). However, if a break occurs at a point closer (in terms of distance along the sensor cable 116) to the base unit 106 than the depth of water, such as break point 130, it may not be possible to lift the two portions of the cable to the surface because in one direction the sensor cable 116 is coupled to the base unit. Thus, in the example of a break point 130 in sensor cable 116, the tail termination module 126 may be decoupled from the base unit 106, and the end of the sensor cable 116 coupled to the tail termination module along with a portion after the break at the example break point 130, may be raised to the surface for repair.

Figure 2:
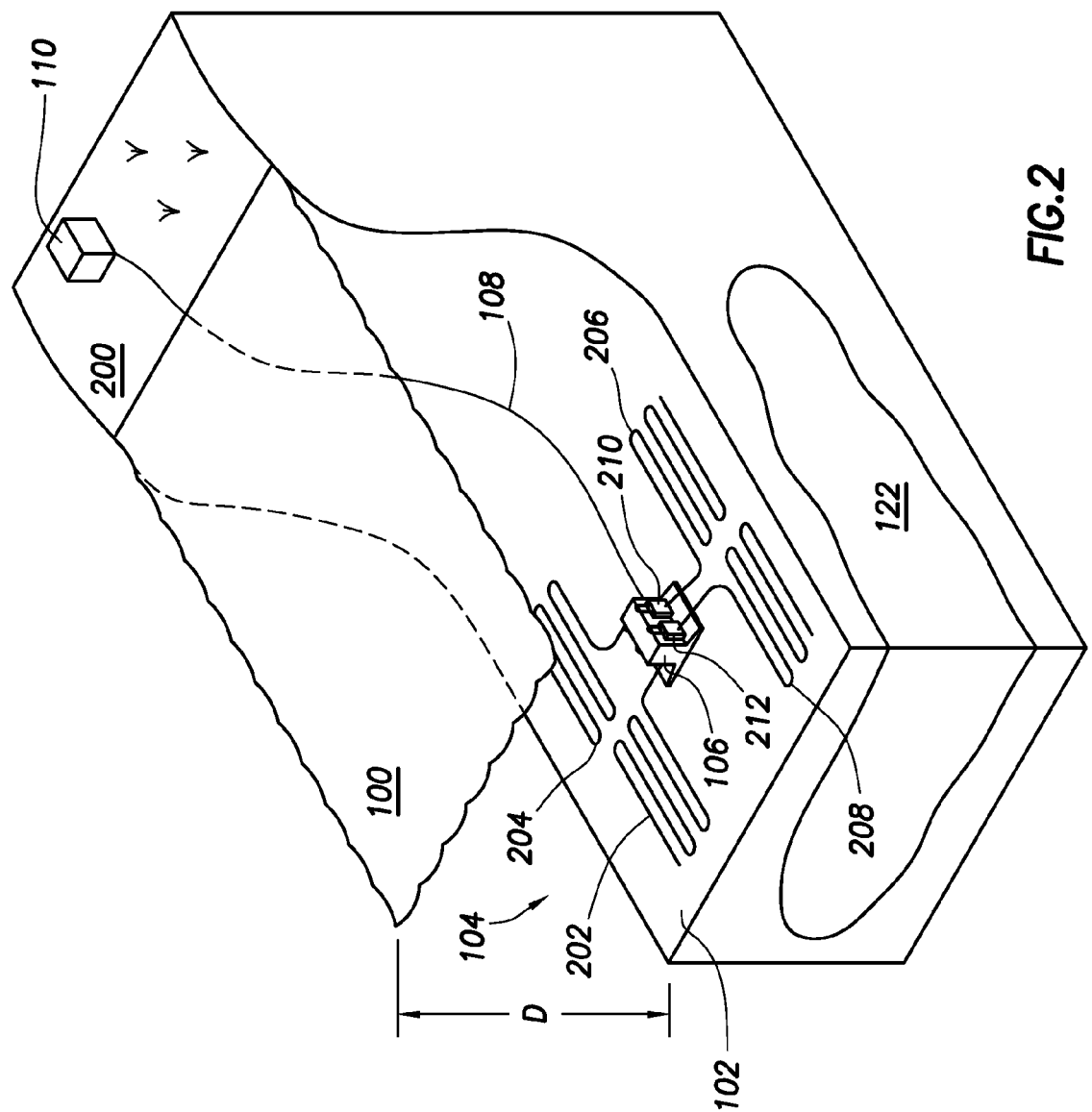
FIG. 2 shows a perspective cut-away view of a hydrocarbon reservoir monitoring system in accordance with at least some embodiments.

FIG. 2 shows a perspective cut-away view of a portion of a marine environment comprising a permanent reservoir monitoring system in order to illustrate alternative arrangements. In particular, FIG. 2 shows the surface 100 of the water proximate the shore 200. As before, the sea floor 102 resides at a distance D below the surface 100, and below the sea floor 102 resides the hydrocarbon reservoir 122. The reservoir monitoring system 104 resides proximate the sea floor 102, and the reservoir monitoring system comprises base unit 106. The base unit mechanically and communicatively couples to an umbilical cable 108 that extends from the base unit 106 to computer system 110 at the surface. In the example system of FIG. 2, the computer system 110 resides on the shore. By way of the umbilical cable 108, the base unit 106, as well as the various sensor cables, is communicatively coupled to the computer system 110.

The illustrative reservoir monitoring system 104 of FIG. 2 comprises four sensor cables 202, 204, 206, and 208, each sensor cable having a plurality of seismic device (not specifically shown). Much like the system of FIG. 1, each sensor cable 202, 204, 206, and 208 mechanically and communicatively couples to the base unit 106; however, unlike FIG. 1, the sensor cables 202, 204, 206, and 208 couple only on one end to the base unit 106. In the illustrative system of FIG. 2 each sensor cable 202, 204, 206, and 208 couples to the base unit 106 by way of a termination module. In FIG. 2, termination modules 210 and 212 are associated with sensor cable 206 and 208, respectively. While sensor cables 202 and 204 likewise couple to the base unit 106 by way of termination modules, the termination modules are not visible in FIG. 2.

As with the system of FIG. 2, each termination module may be selectively coupled and decoupled from the base unit. That is, coupling of a termination module both mechanically and communicatively couples the end of the respective sensor cable to the base unit 106. Likewise, decoupling the termination module both mechanically and communicatively decouples the end of the respective sensor cable from the base unit 106.

Thus, FIG. 2 illustrates that the sensor cables need not be loops with each end being coupled to the base unit. Moreover, FIG. 2 illustrates that more than two independent sensor cables may be used within a reservoir monitoring system. Further still, FIG. 2 illustrates that the recording equipment may reside at any suitable location at or near the surface 100, including on shore as shown in FIG. 2. The sensor-cable loop embodiments of FIG. 1 and the sensor-cable non-loop embodiments of FIG. 2 are not mutually exclusive; rather, reservoir monitoring systems may simultaneously have both looped and non-looped sensor cables. The specification now turns to a discussion in greater detail of the components of reservoir monitoring systems, starting with an example base unit.

Figure 3:
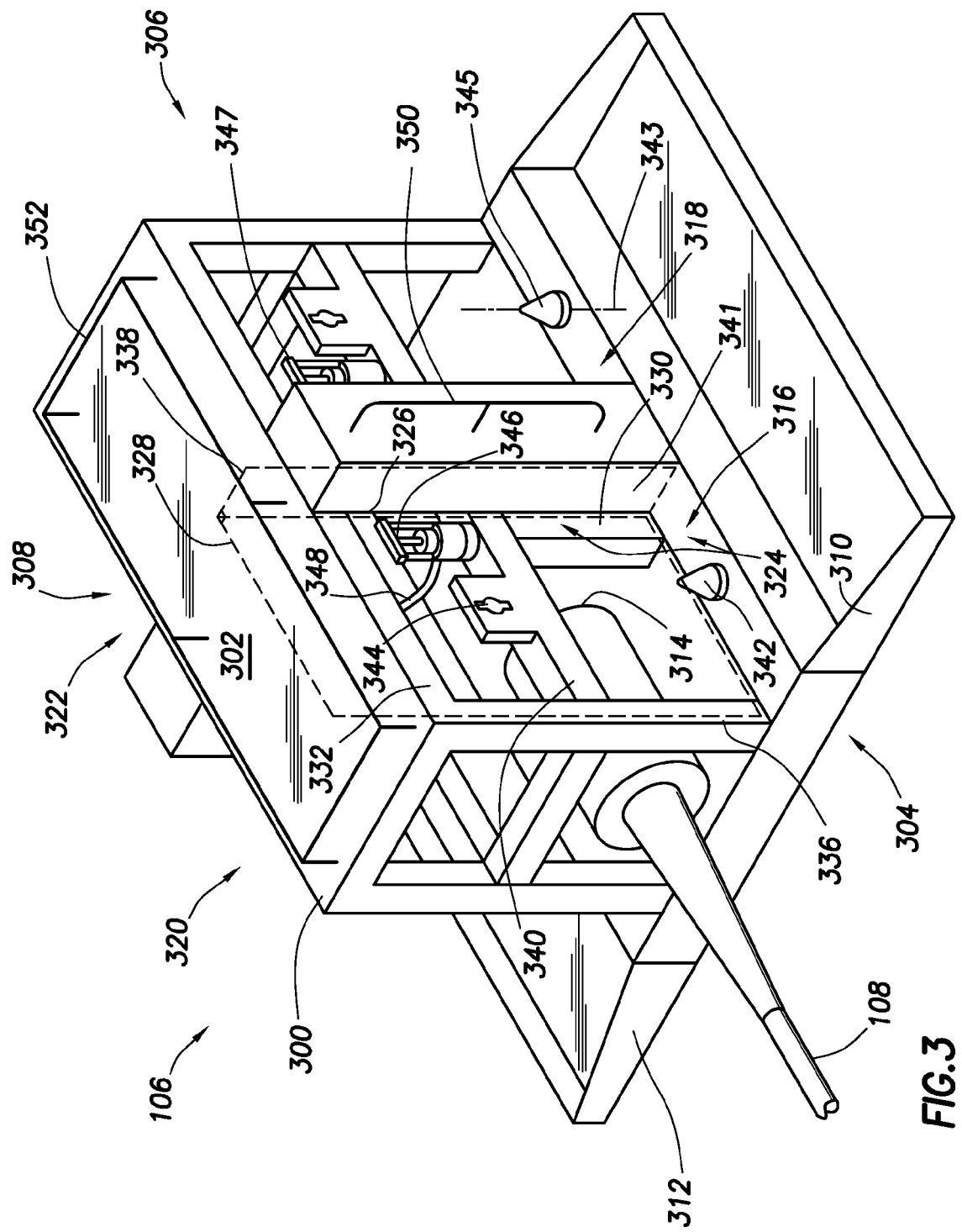
FIG. 3 shows a perspective view of a base unit in accordance with at least some embodiments.

FIG. 3 shows a perspective view of a base unit (without a termination module coupled thereto) in accordance with at least some embodiments. In particular, the example base unit 106 comprises a frame or structure 300 that defines a top 302, a bottom 304 as well as side 306 (visible in FIG. 3) and side 308 (obstructed from view from the perspective of FIG. 3). The base unit 106 may be constructed of a metallic material, and may also be protected from corrosion by various methods and systems, such as protective coating and sacrificial anodes (not specifically shown). Though the example structure 300 of FIG. 3 is shown to be made of square or rectangular metallic material, the base unit may be made from any suitable type of metal, such as I-beam, channel iron, iron plate, or combinations, as suitable for the installed location of the base unit and the expected loading that may be placed upon the base structure. The example base unit 106 of FIG. 1 comprises footing members 310 and 312 which may assist in forming a stable base for the base unit 106 at a sea bed location defined by loose sediment. In other cases, such as cases where the sea bed is defined by exposed rock, the footing members may be omitted. In yet still other cases, other mechanisms may be used to secure the base unit 106 to the sea floor, such as piling, suction pilings, anchors, and anchor chains.

Base unit 106 further comprises an enclosure 314 mechanically coupled to the structure 300. The enclosure 314 is, in some example cases, a metallic structure that defines an interior volume. In one example situation, and as shown, the enclosure is a right circular cylinder constructed of titanium sealed on both ends, and within which optical devices reside (the optical devices communicatively coupled to optical fibers within the umbilical cable). The enclosure 314 mechanically couples to strength members within the umbilical cable 108 in such a way that tension carried on the umbilical cable 108 proximate to the base unit 106 is transferred through the metallic material of the enclosure 314 to the structure 300, and the tension is not carried or transferred to the optical devices within the enclosure 314. Example optical devices are discussed more below. Both the mechanism for attachment of the enclosure 314 to the structure 300, as well as the enclosure 314 itself, is designed to carry a load greater than the load carrying capability of the umbilical cable such that, in the event significant tension force is applied to the umbilical cable (e.g., snagged and dragged by a ship's anchor or fishing gear), the umbilical cable should fail prior to inelastic deformation or failure of the enclosure 314 and/or the structure 300. Moreover, the enclosure is designed such that, even in the event of umbilical failure resulting from overtension, the optical devices within the enclosure will not be subjected to mechanical forces.

Still referring to FIG. 3, the example base unit 106 further defines four attachment locations for termination modules (not shown). In particular, the example base unit 106 defines attachment locations 316, 318, 320, and 322. Attachment location 316 can be seen in full in the perspective view of FIG. 3, attachment location 318 is shown in partial view, and attachment locations 320 and 322 are substantially hidden from view in the perspective view of FIG. 3. The example base unit 106 has four attachment locations; however, one or more attachment locations may be defined on a base unit as needed for any particular situation. The example base unit, and attachment locations, is scalable at the design stage to accommodate any number of attachment locations to fit any particular situation. The discussion that follows is in reference to attachment location 316 with the understanding that the description is equally valid with respect to the other attachment locations (but physically mirrored with respect to attachment locations 318 and 320).

Attachment location 316 includes a coarse alignment framework and a fine alignment mechanism. The coarse alignment framework provides a coarse alignment of a termination module when the termination module is being landed (e.g., with the assistance of a remotely operated vehicle (ROV)) into a coupled relationship with the base unit. In particular, the coarse alignment framework 324 of the attachment location 316 includes a corner 326 defined at least in part by the structure 300. More particularly, the structure 300 defines a backplane 328 (the plane 328 illustrated by dashed lines) and a side plane 338 (the plane 338 shown in dashed lines). The backplane 328 is defined by the outward face of members 330, 332, 336, and 340. The side plane 338 is defined by the outward face of member 341. In accordance with at least some embodiments, the backplane 328 of the coarse alignment framework 324 is perpendicular to the side plane 338. Stated otherwise, the outward face of members 330, 332, 334, and 336 are at right angles to the abutting outward face of member 341.

Still referring to FIG. 3, the example attachment location 316 further comprises a fine alignment mechanism in the form a conical pin 342 which defines an inverted conic frustum. The conical pin 342 defines a central axis, and the central axis is parallel to both backplane 328 and the side plane 338. The central axis of conical pin 342 is not shown with respect to location 316 so as not to further complicate the figure, but an example central axis 343 is shown for conical pin 345 of the attachment location 318. As a termination module is lowered into place (e.g., with the help of an underwater intervention system, such as a diver or remotely operated vehicle (ROV)), coarse alignment may be achieved by forcing the termination module into the corner 326 defined by the backplane 328 and side plane 338. As the termination module is lowered further, a complementary aperture defined in a bottom of the termination module (the aperture discussed more below) telescopes over the conical pin 342, thus providing the fine alignment of the termination module in the attachment location 316. Moreover, the aperture of the termination module over the conical pin 342 provides lateral support for the termination module at the lower portions thereof.

In accordance with at least some embodiments, an upper portion of the termination module is releasably coupled to the base unit 106 by way of a locking mechanism. The locking mechanism includes a portion on the termination module and a portion on the base unit. Because FIG. 3 shows only the base unit 106, only a portion of the overall locking mechanism is shown. In particular, the illustrative portion of the locking mechanism visible in FIG. 3 is a key aperture 344 defined in the structure 300 of the base unit. The locking mechanism as a whole is discussed more thoroughly below, and thus a more complete description of the key aperture 344 and the role of the key aperture 344 in coupling the termination module to the base unit 106 are likewise presented below.

Still referring to FIG. 3, at least a portion of the optical communication channels that flow through optical devices in the enclosure 314 couple to the sensor cable associated with the termination module ultimately attached at attachment location 316. Inasmuch as the termination module, and thus the sensor cable, is releasably coupled to the base unit 106, the communicative channel between the umbilical cable 108 and the sensor cable comprises a releasable optical coupler. In the view of FIG. 3, only a portion of the releasable optical coupler is shown, coupler portion 346. In particular, coupler portion 346 is coupled to an optical lead 348 which communicatively couples to optical devices within the enclosure 314. In the situation of FIG. 3 where no termination module has been landed in the attachment location 316, the coupler portion 346 may be placed at a staging location, as shown, where no communicative coupling of the optical fibers is provided. The coupler portion 347 associated with attachment location 318 is likewise partially shown.

Again, each attachment location comprises a coarse alignment framework, a fine alignment mechanism, a portion of a locking mechanism, and at least one coupler portion of a releasable optical coupler. In some cases, the physical layout may be mirrored (e.g., as between attachment location 316 and attachment location 318). Or, given a base unit of sufficient size, even attachment locations disposed on the same side of the structure may have the same physical layout of the coarse alignment structure, fine alignment mechanism, portion of the locking mechanism, and staging location for the optical coupler portion.

In some cases, landing of a termination module may be performed with the assistance of an underwater intervention system (e.g., ROV, or a diver in an atmospheric diving suit), and to assist the underwater intervention system various physical structures may be present on the base unit 106. For example, a manipulator rail 350 may be provided on the side 306 such that a ROV can grab and hold the rail 350 to steady the ROV as part of guiding the termination module into a coupled orientation. Likewise, upper rail 352 may provide a basket area for placing objects for later use (e.g., lifting cables for the base unit 106 itself, protective covers over unused portions of a releasable optical coupler).

Figure 4:
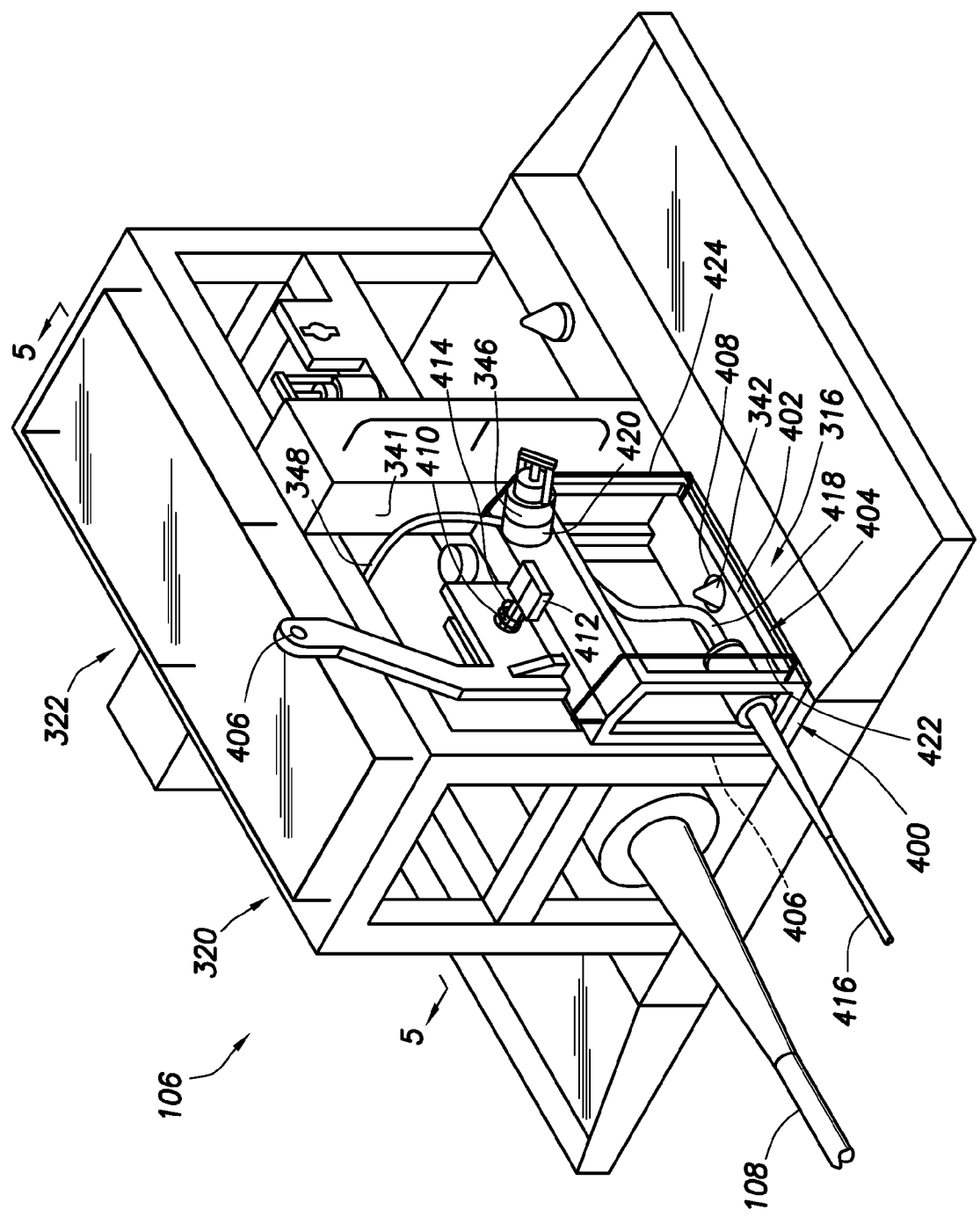
FIG. 4 shows a perspective view of a base unit and termination module in accordance with at least some embodiments view.

FIG. 4 shows a perspective view of the base unit with a termination module 400 coupled to the base unit. Termination module 400 is illustrative of any of the aforementioned termination modules. The example termination module 400 comprises a frame 402 that defines an outward facing front portion 404 as well as back portion 406 shown in an abutting relationship with the backplane 328 (reference number not shown in FIG. 4) of the attachment location 316. The frame 402 likewise is shown in an abutting relationship with side plane 338 (reference number not shown in FIG. 4) defined by the outward face of member 341. The frame is made of a metallic material of any suitable type and shape. Like the structure 300, the frame 402 may be protected from corrosion by various methods and systems, such as protective coatings and sacrificial anodes (not specifically shown). Though the example frame 402 of FIG. 4 is shown to be made of square or rectangular metallic material, the frame 402 may be made from any suitable type of metal, such as I-beam, channel iron, iron plate, or combinations as suitable for the installed location and the expected loading that may be placed upon the frame 402.

The example termination module further defines a lifting eye 406 coupled to the frame 402. The lifting eye may be coupled to a rope extending to a winch on a surface vessel such that the depth of the termination module may be controlled during coupling of the termination module 400 to the base unit 106. Likewise, the lifting eye 406 may be coupled to a rope extending to a winch on a surface vessel such that the depth of the termination module may be controlled during decoupling of the termination module 400 from the base unit 106. Having a lifting eye 406 is not strictly required. In some cases, depending on the size of the termination module the attached sensor cable can be used as the mechanism to provide vertical support during landing operations.

The frame 402 of the termination module 400 further comprises an aperture 408 defined in a lower portion thereof. As illustrated, the aperture may be configured to telescope over the conical pin 342 during landing of the termination module 400 to provide fine alignment of the module with the base unit 106. Though not visible in FIG. 4, in some cases the aperture itself defines an inverted conic frustum that complements the shape of the conical pin 342 for alignment purposes.

Still referring to FIG. 4, the termination module 400 further comprises a portion of the locking mechanism at an upper portion of the termination module 400. In particular, FIG. 4 shows a portion of a key member 410 rigidly coupled to a paddle member 412, the key member 410 and paddle member 412 are secured to the frame 402, but secured in such a way that both the key member 410 and paddle member 412 may rotate about a central axis of the key member and also may be translated toward and away from the base unit 106. In some cases, a biasing member 414 (illustratively shown in the form of a coil spring) may bias the key member 410 and paddle member away from the base unit 106 when not locked (e.g., to disengage the key member 410 from the key aperture 344). The paddle member 412 is sized to enable a manipulator of an underwater intervention system to grasp, translate, and rotate to the key member to lock the termination module into place. In short, the key member 410 in combination with the key aperture 344 mechanically locks the termination module in place, which prevents both upward movement as well as rotational movement about an axis at the bottom of the frame 402. Conical pin 342 and corresponding aperture 408 prevent lateral movement of the bottom of frame 402. The two mechanisms working together thus mechanically lock the termination module 400 in place. The locking mechanism is discussed more thoroughly below.

The frame 402 mechanically couples to strength members within a sensor cable 416. Sensor cable 416 is illustrative of any of the previously mentioned sensor cables. Sensor cable 416 couples to the frame 402 in such a way that tension carried on the sensor cable 416 proximate to the base unit 106 and/or termination module 400 is transferred through the metallic material of the frame 402 to the structure 300. The mechanical coupling between strength members of the sensor cable 416, as well as the frame 402 itself, is designed to carry a load greater than the load carrying capability of the sensor cable such that, in the event significant tension force is applied to the sensor cable (e.g., snagged and dragged by a ship's anchor or fishing gear), the sensor cable 416 should fail prior to inelastic deformation or failure of the frame 402 and/or the structure 300.

In addition to the strength members, the sensor cable 416 further comprises optical fibers that are communicatively coupled, by way of optical lead 418, to a coupler portion 420 associated with the termination module 400. In particular, at least a portion of the optical communication channels that flow through optical devices in the enclosure 314 couple to the sensor cable 416. Inasmuch as the termination module 400, and thus the sensor cable 416, is releasably coupled to the base unit 106, the communicative channel between the umbilical cable 108 and the sensor cable 416 comprises a releasable optical coupler. In the view of FIG. 4, the coupler portion 346 is shown removed from the staging location (e.g., removed by a ROV) and coupled with coupler portion 420 associated with the termination module 400. The releasable optical couplers may be of any suitable type designed for marine environments, such as the releasable optical couplers manufactured by Teledyne Ocean Designs, Inc. of Houston, Tex.

The mechanical coupling of strength members in the sensor cable 416 to the frame 402 as well as the communicative coupling between the sensor cable 416 and the umbilical cable 108 (through the releasable optical coupler) are designed in such a way that tension carried on the sensor cable 416 is not communicated to the releasable optical coupler. That is, the sensor cable 416 couples to the frame 402 in such a way that tension carried on the sensor cable 416 proximate to the base unit 106 and/or termination module 400 is not communicated to the releasable optical coupler. As stated before, the mechanical coupling between strength members of the sensor cable 416 and the frame 402 is designed to carry a load greater than the load carrying capability of the sensor cable such that, in the event significant tension force is applied to the sensor cable (e.g., snagged and dragged by a ship's anchor or fishing gear), the sensor cable should fail prior to inelastic deformation or failure of the frame 402 and/or the structure 300, all without applying the tension to the releasable optical coupler. Even to the point of the tension on the sensor cable 416 dragging the base unit 106 and attached termination module 400 across the sea bed, no tension carried in the sensor cable is conveyed to the releasable optical coupler. It is to be understood that there may be mechanical forces applied to the releasable optical coupler caused by, for example, torsion applied by stiffness of the optical leads 348 and 418 and/or water currents flowing through the base unit 106, but such mechanical forces do not originate from the sensor cable 416, from the tension on any other sensor cable coupled to the base unit 106, or from tension carried on the umbilical cable 108.

Mechanically isolating the releasable optical couplers from tension forces carried on the umbilical cable 108 and/or the sensor cables may reduce the chances of damage to the releasable optical couplers on-station (i.e., where the reservoir monitoring system has been installed). That is, breaks in the umbilical cable and/or the sensor cables can be, in most cases, economically repaired on-station. By contrast, delicate devices like releasable optical couplers cannot be economically repaired on-station. By having a base unit of a reservoir monitoring system designed and constructed to be able to withstand failure strength of the umbilical cable and/or sensor cables, the failure mechanisms are then limited to on-station repairable devices—the optical cables themselves.

The description of termination module 400 in attachment location 316 is illustrative of any termination module in any attachment location. Moreover, many changes and variants are possible. For example, the lifting eye 406 may sit atop an "A" frame structure, but was not drawn as such in FIG. 4 so as not to obscure other aspects (e.g., the optical lead 348 or staging location for the coupler portion 346. Moreover, additional frame members may be used for frame 402 of termination module 400, but such are not shown so as not to unduly complicate the figure. While only one releasable optical coupler is shown for each attachment location and for the example termination module 400, multiple such releasable optical couples and corresponding optical leads may be used if desired for any particular operational circumstance.

Finally with respect to the example termination module 400, coupling the termination module 400 to the attachment location 316, and likewise decoupling the termination module 316, may involve the use of an underwater intervention system. In order to assist the underwater intervention system in placing the termination module 400 within the attachment location 316, the termination module 400 may further comprise manipulator rails 422 and 424. Manipulator rails 422 and 424 may be provided on the termination module such that, for example, an ROV can grab and hold one or both of the rails 422 and 424 as part of guiding the termination module 400 into a coupled orientation with the attachment location 316.

The specification now turns to a distribution of communication channels within the base unit 106.

Figure 5:
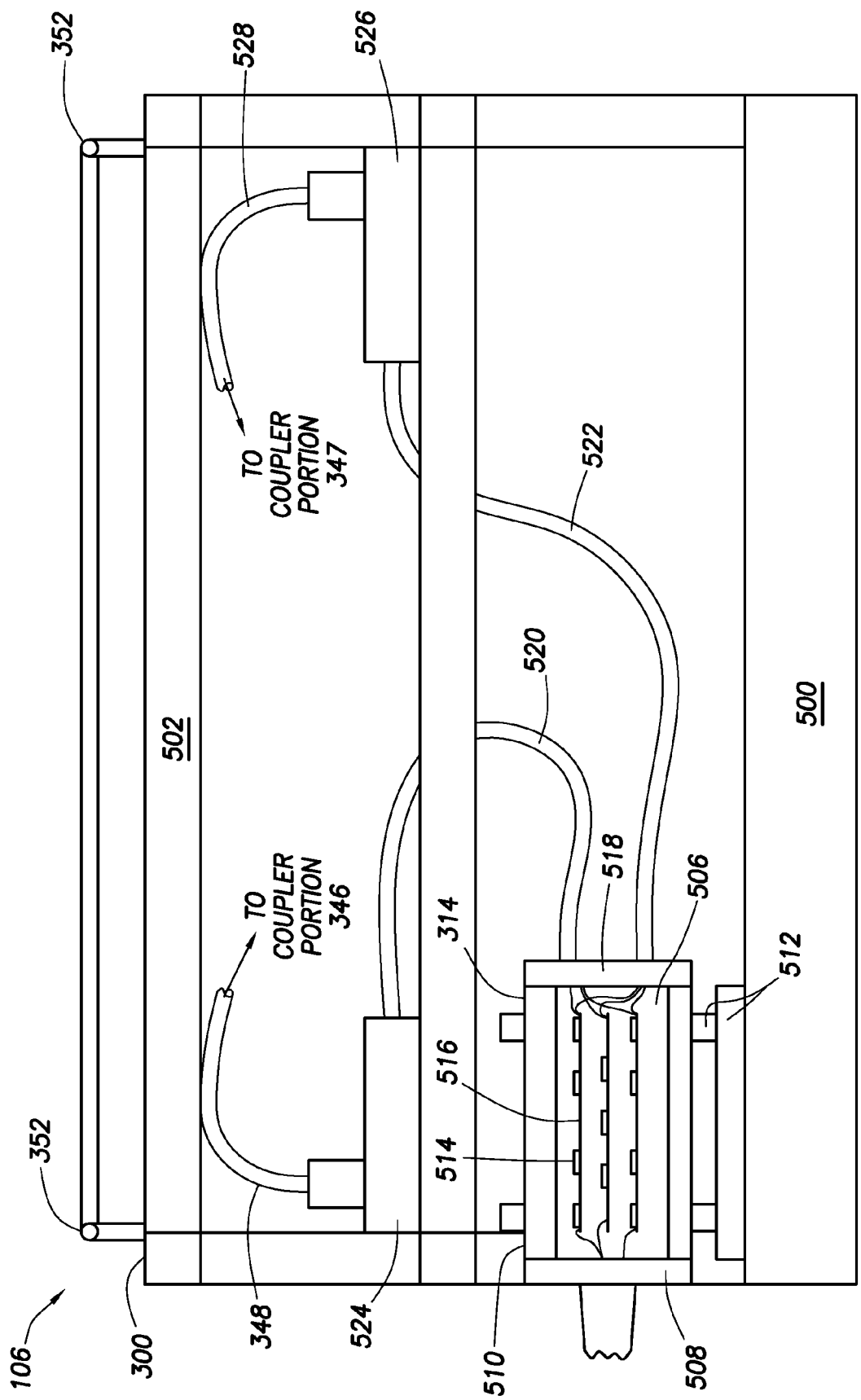
FIG. 5 shows a cross-sectional elevation view of the base unit of FIG. 4 in accordance with at least some embodiments.

FIG. 5 shows a cross-sectional elevation view of the base unit 106 taken substantially along line 5-5 of FIG. 4. In particular, FIG. 5 shows a portion of a floor member 500, a portion of the top or roof member 502, a portion of the basket rail 352, as well as enclosure 314 coupled to the floor member 500. The cross-sectional view of FIG. 5 shows the interior volume 506 defined by the enclosure. That is, the enclosure 314 defines an interior volume 506, and the enclosure is water tight such that devices disposed within the interior volume stay dry when the base unit 106 is disposed at or near the sea bed in a marine environment. The enclosure 314 comprises a lid or cap 508 coupled to a cylindrical member 510 of the enclosure (although the member 510 may take any suitable shape). Cap 508 may be mechanically coupled to the cylindrical member 510 using any suitable fasteners (e.g., screws, bolts, latches). Given that the enclosure is water tight, the cap 508 seals to the cylindrical member 510 by any suitable mechanism (e.g., O-rings, gaskets). The strength members of the umbilical cable 108 (not shown in FIG. 5) mechanically couple to the cap 508, and tension forces on the umbilical cable proximate to the base unit 106 couple to structure 300 through the cap 508, cylinder member 510, and mounting structure 512.

Optical fibers within the umbilical extend through the cap 508 and are communicatively coupled to optical devices within the interior volume 506. In particular, within the interior volume may reside a plurality of optical devices, such as optical device 514, residing on component boards 516. Though three illustrative component boards 516 are shown in FIG. 5, one or more component boards may be used. The component boards are coupled within the interior volume of the enclosure in such a way that elastic deformation (if any) of the cap 508 and/or cylindrical member 510 (when carrying forces of the umbilical cable) does not impart mechanical loads on the optical devices and/or component boards. The optical devices may take any suitable form for the particular communicative situation, such as optical amplifiers, optical gate devices, multiplexers, and demultiplexers. An example optical system is discussed in greater detail below.

On an end of the cylindrical member 314 opposite the cap 508 resides a second cap 518. The cap 518 mechanically couples to the cylindrical member 510 using any suitable fasteners (e.g., screws, bolts, latches). Given that the enclosure is water tight, the cap 518 seals to the cylindrical member 510 by any suitable mechanism (e.g., O-rings, gaskets). Communicative channels associated with the umbilical cable 108 and component boards 516 couple through the cap 518 to optical leads associated with the attachment locations. In the view of FIG. 5, two optical leads 520 and 522 are visible. In the example system described, each attachment location is associated with an optical lead, and thus four such optical leads may be present in the base unit 106 (though only two are visible). Other numbers of optical leads may be used depending on the number of attachment locations, and the number of communication channels each optical lead may support. For example, in one embodiment a single optical lead from the enclosure may be used to support a plurality of attachment locations, or there may be one optical lead for each attachment location with no intervening distribution points.

Still referring to FIG. 5, in the example system each optical lead may couple to a distribution point. For example, optical lead 520 may couple to distribution point 524. Likewise, optical lead 522 may couple to distribution point 526. In cases where a single optical lead supports multiple attachment points, or cases where even for a single attachment point multiple releasable optical couplers are used, the distribution point may be the location at which the various optical channels are separated into dedicated optical leads. Moreover, in some cases the optical leads may be fluid filled and operated in such a way that pressure of the fluid within the optical lead is maintained at approximately the same pressure as the surrounding water. In these cases, the distribution points may act to control pressure of the fluid within the optical leads. That is, while the fluid within the optical leads may be fluidly isolated from the surrounding water, the pressure of the surrounding water is nonetheless conveyed to the fluid within the optical leads by any suitable systems (e.g., piston arrangement where the piston is exposed on one side the surrounding water pressure and exposed on a second side to the fluid within the optical lead, or an elastomeric member where the elastomeric member is exposed on one side the surrounding water pressure and exposed on a second side to the fluid within the optical lead).

In the example case of FIG. 5, optical lead 520 couples to distribution point 524, which in turn couples to optical lead 348 for attachment location 316. Likewise, optical lead 522 couples to distribution point 526, which in turn couples to optical lead 528 for attachment location 318. Although the attachment locations 316 and 318 are "behind" the view of FIG. 5, for purposes of ensuring that the optical leads 348 and 528 do not exceed bend radius limitations, the distribution points 524 and 526 are coupled physically closer to the attachment locations 320 and 322. In other situations the distribution points may be placed closer to the respective attachment locations. In an example system having four attachment locations, two additional optical leads from the enclosure 314 may likewise couple to two additional distribution points that are not visible in FIG. 5. The specification now turns to an example situation for coupling a termination module at an attachment location.

Figure 6:
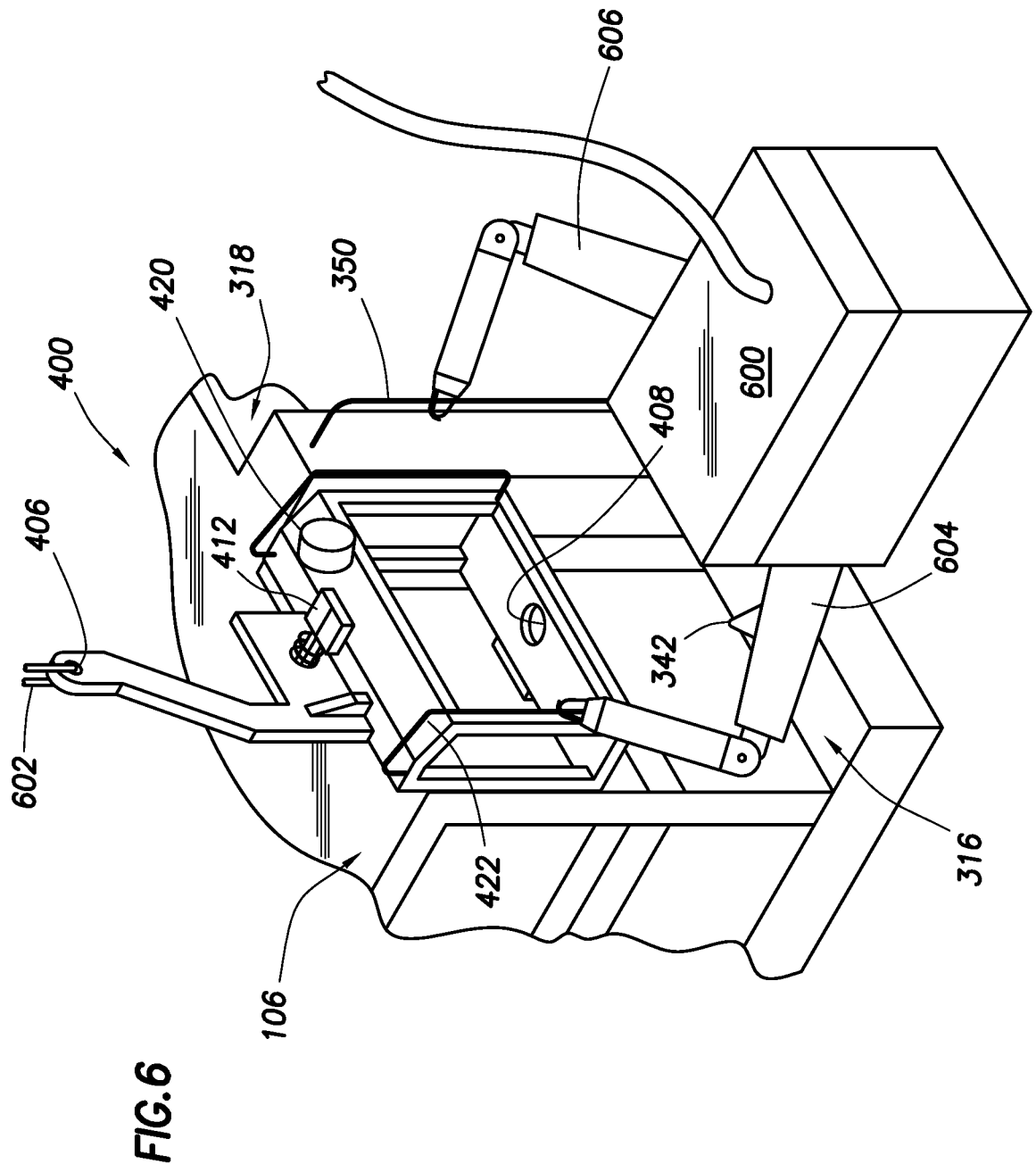
FIG. 6 shows a perspective view of a base unit and termination module during an operation to couple the termination module to the base unit, in accordance with at least some embodiments.

FIG. 6 shows a perspective view of a method and/or system of attaching a termination module to a base unit in accordance with at least some embodiments. In particular, FIG. 6 shows a portion of the base unit 106, as well as a termination module 400 being guided into place by a ROV 600. Both the base unit 106 and termination module 400 are shown in simplified form (e.g., the umbilical cable and sensor cables are not shown) so as not to unduly complicate the discussion. Moreover, use of the ROV is merely an example, and in some cases, depending on depth, a diver (e.g., a diver in an atmospheric diving suit) may perform the functions. In order to couple the termination module to the base unit, the termination module may be lowered from the surface by way of a line 602 coupled to the lifting eye 406. That is, depth of the termination module 400 during landing operations may be controlled at least in part by a surface vessel controlling the length of line spooled from a winch on the surface vessel.

As the termination module gets close to the base unit 106, the example ROV 600 at the location assists in placing the termination module in the proper orientation with respect to the attachment location 316. For example, the ROV 600 may comprise at least one arm or manipulator, and as illustrated manipulators 604 and 606. Each manipulator has a gripping device such as a jaw or end-effector coupled on the distal end thereof to enable grabbing either termination module 400, base unit 106, or both. The example ROV may thus rotate the termination module 400 about an axis defined by the line 602 to ensure proper orientation with respect to the attachment location 316. Moreover, the ROV 600 may assist in aligning the termination module 400 with the coarse alignment framework. For example, the ROV 600, by gripping a manipulator rail 422, may provide a force to align the termination module with the coarse alignment framework (i.e., push the termination module into the "corner" defined by the back plane and the side plane). In some cases the force may be supplied by the ROV directly (e.g., operation of thrusters of the ROV or the diver's suit), and in other cases the force may be supplied by gripping the base unit, such as gripping the manipulator rail 350 that resides between the two illustrative attachment locations 316 and 318.

Once the termination module 400 has been lowered into position at the attachment location, and the conical pin 342 telescoped within the aperture 408 (i.e., the fine alignment mechanism), the example ROV may release the grip on the manipulator rail 422 and perform the functions of locking the termination module 400 in place, and optically coupling the sensor cable. In particular with respect to optically coupling the sensor cable, the example ROV 600 may grab the coupler portion 346 (not shown in FIG. 6) for the communication coupling, and plug the coupler portion 346 into the coupler portion 420 defined on the termination module 400. Moreover, the example ROV 600 may grab the paddle member 412 of the locking mechanism, push the paddle member inward (i.e., toward the base unit 106), thus pushing key member 410 into the key aperture 344 (not visible in FIG. 6), and rotating the paddle member 412.

The specification thus turns to a more detailed description of the locking mechanism.

Figure 7:
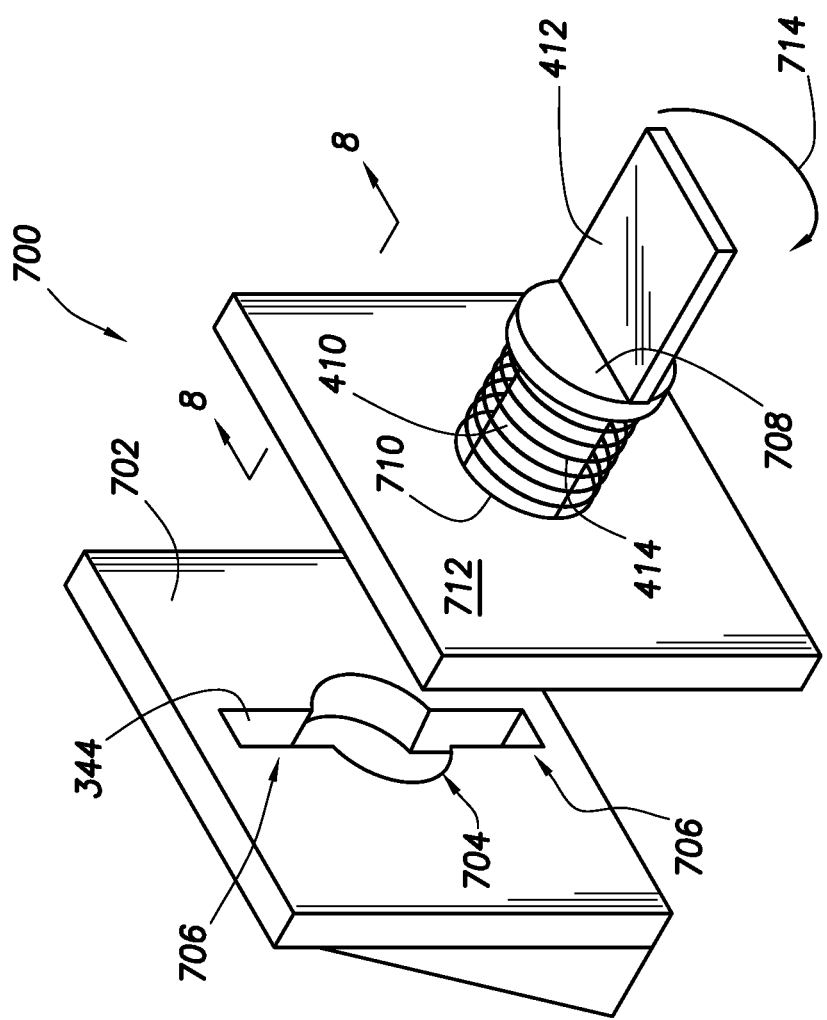
FIG. 7 shows a perspective view of a locking mechanism in accordance with at least some embodiments.

FIG. 7 shows a perspective view of a locking mechanism in accordance with at least some embodiments. In particular, FIG. 7 shows and discusses locking mechanism 700 associated with the termination module 400 and attachment location 316; however, the discussion is equally applicable to any locking mechanism associated with any attachment location and/or termination module. The example locking mechanism comprises key aperture 344 defined in a structural member of the base unit 106, and as illustrated the key aperture is defined in a backing member 702. The example key aperture defines a circular portion 704 as well as two slot portions 706. In FIG. 7, the slot portions extend in a vertical alignment in relation to the circular portion 704, but in other cases the slot portions may extend in any suitable direction, including at angles less than 180 degrees. Moreover, additional slot portions may be provided, and in other cases a single slot portion may be provided.

The locking mechanism further comprises key member 410 (disposed under bias member 414), a bias backing member 708, and paddle member 412. The key member 410 is, in some embodiments, a metallic member that defines a circular cross-section. In many cases, taking into account that the key member 410 may carry significant mechanical load conveyed to the frame 402 of the termination module 400 (not shown in FIG. 8), the key member 410 may be a solid cylinder of metallic material. As shown, the bias member 414 biases the key member 410 and the paddle member 412 into a retracted or unlocked orientation, by providing a bias force on the bias backing member 708. The key member 410 extends through an aperture 710 of the structural member 712 coupled to the termination module (not shown in FIG. 7).

Figure 8:
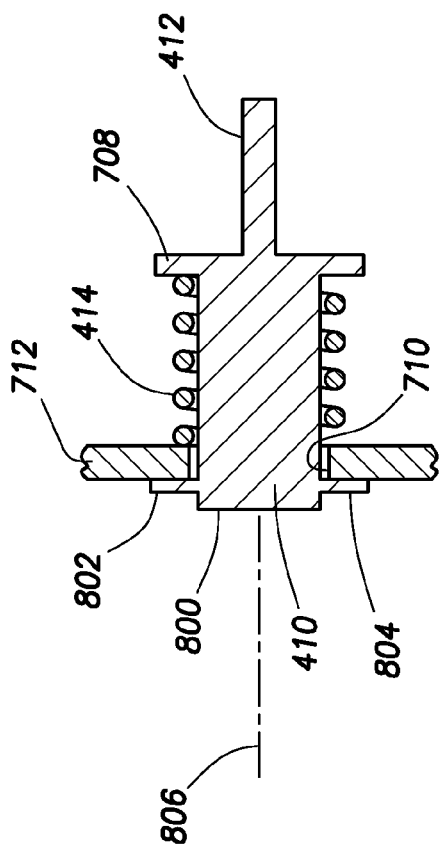
FIG. 8 shows a cross-sectional elevation view of a portion of the locking mechanism of FIG. 7.

FIG. 8 shows a cross-sectional elevation view taken substantially along line 8-8 of FIG. 7 to show additional components of the locking mechanism. In particular, FIG. 8 shows the structural member 712 and aperture 710. Extending through the aperture is the key member 410. On the right side of the figure is shown the bias backing member 708 abutting the paddle member 412, and the bias member 414 in the form of a coil spring. On the opposite side of the structural member 712 resides a distal portion 800 of the key member 410, as well as two illustrative protrusions 802 and 804. In particular, in the illustrative case of FIG. 8, the key member 410 defines a central axis 806, and the example protrusions 802 and 804 extend from the key member 410 in a direction perpendicular to the central axis 806. As shown in FIG. 8, the key member 410 is in an unlocked configuration, where the bias member 414 biases the key member away from (out of) the key aperture, and the protrusions 802 and 804 abut a backside of the structural member 712.

Referring simultaneously to FIGS. 7 and 8, in the unlocked configuration the bias member 414 retracts the key member 410, and the protrusions align 802 and 804 with the slot portions 706 of the key aperture 344. It is noted that in the configuration shown it is possible to rotate the key member 410 by way of the paddle member 412 and thus effect a misalignment of the protrusions and the key aperture 344. It follows that in some cases markings may be provided at any convenient location to show the correct orientation of the paddle member 412 to have the protrusion 802 and 804 align with the slot portions 706 of the key aperture 344 in the unlocked configuration.

To lock the example system by way of the locking mechanism 700, a ROV end-effector grasps the paddle member 412 and pushes the paddle member 412 toward the structural member 712. Pushing the paddle member 412 toward the structural member 712 not only compresses the bias member 414, but also extends the distal end 800 of the key member 410 (along with the protrusions) away from structural member 712. With the termination module 400 in a proper orientation, the key member 410 thus extends into and through the key aperture 344 in the backing member 702. Once the protrusions pass completely through the through backing member 702, locking is effectuated by the ROV rotating the paddle member 90 degrees (as shown by arrow 714) such that the protrusions are misaligned with the key aperture 344 and thus abutting a back side of the backing member 702. That is, in a locked configuration the protrusions abut the back side of the backing member 702, thus ensuring that the termination module 400 cannot, at the location of the locking mechanism 700, be pulled away from the base unit 106.

Figure 9:
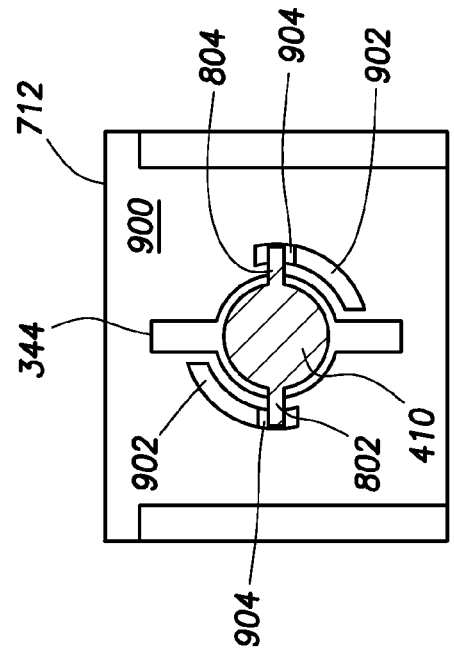
FIG. 9 shows a back elevation view of a portion of the locking mechanism in accordance with at least some embodiments.

FIG. 9 shows an elevation view of the back side of the backing member 702 when the key member 410 is in the locked configuration. In particular, the key member 410 in FIG. 9 is shown to be extended through key aperture 344 and rotated through 90 degrees to lock the protrusions 802 and 804 against the backside 900 (i.e., the side of the structural member 712 opposite outward face of member 340). In some cases, merely misaligning the protrusions 802 and 804 with respect to the key aperture may be sufficient; however, in other cases the protrusions may work in conjunction with other features (such as the bias member 414) to ensure that the key member 410 and paddle member 412 do not inadvertently rotate to an unlocked configuration.

In example cases, the backside 900 may directly define a ramp and trough arrangement such that, in the locked configuration each protrusion resides within a trough. Taking into account the bias supplied by the bias member 414, the protrusions are held in place in the troughs against inadvertent rotation. In particular, FIG. 9 shows two ramp portions 902, one ramp portion for each protrusion. As the key member 410 is rotated, the protrusions 802 and 804 ride "up" the respective ramp portions until the protrusions align with (i.e., move "down" into) trough portions 904. As the protrusions ride "up" the ramp portions, bias increases on bias member 414. In mating with trough portions 904, the bias force tends to hold the protrusions within their respective trough portions, thus ensuring that key member 410 and paddle member 412 are not inadvertently rotated (such as by water currents or vibration).

Figure 10:
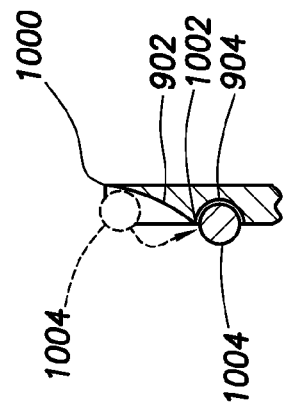
FIG. 10 shows a partial side elevation view of the locking mechanism in accordance with at least some embodiments.

FIG. 10 shows a side elevation view of a ramp and trough arrangement. In particular, FIG. 10 shows a ramp portion 902 that defines a surface that leads from a first displacement position 1000 at a "lower" end of the ramp portion 902 to a second displacement position 1002 at an "upper" end of the ramp portion. As a key member 410 is rotated toward a locked orientation, a protrusion rides "up" the ramp portion 902 (as shown by protrusion 1004 shown in dashed lines), and then the protrusion mates with the trough portion 904 (the protrusion 1004 shown in solid lines), thus locking the protrusion (as the well as the key member 410) in place. In some cases, the ramp portions 902 and trough portions 904 may be constructed directly into the structural member 712 (such as milling the portions into the metallic material of the structural member 712). In other cases, the ramp portions 902 and trough portions 904 may be defined by additional devices (e.g., metallic or plastic structures) coupled to the backside 900 of the structural member 712.

A note before proceeding. The locking mechanism 700, while enabling selective coupling and decoupling of a termination module in the inventive embodiments is accomplished without the use of conventional fasteners (e.g., screw, nut, bolt, pop rivet). The specification now turns to a description of an example optical circuit for a reservoir monitoring system.

Figure 11:
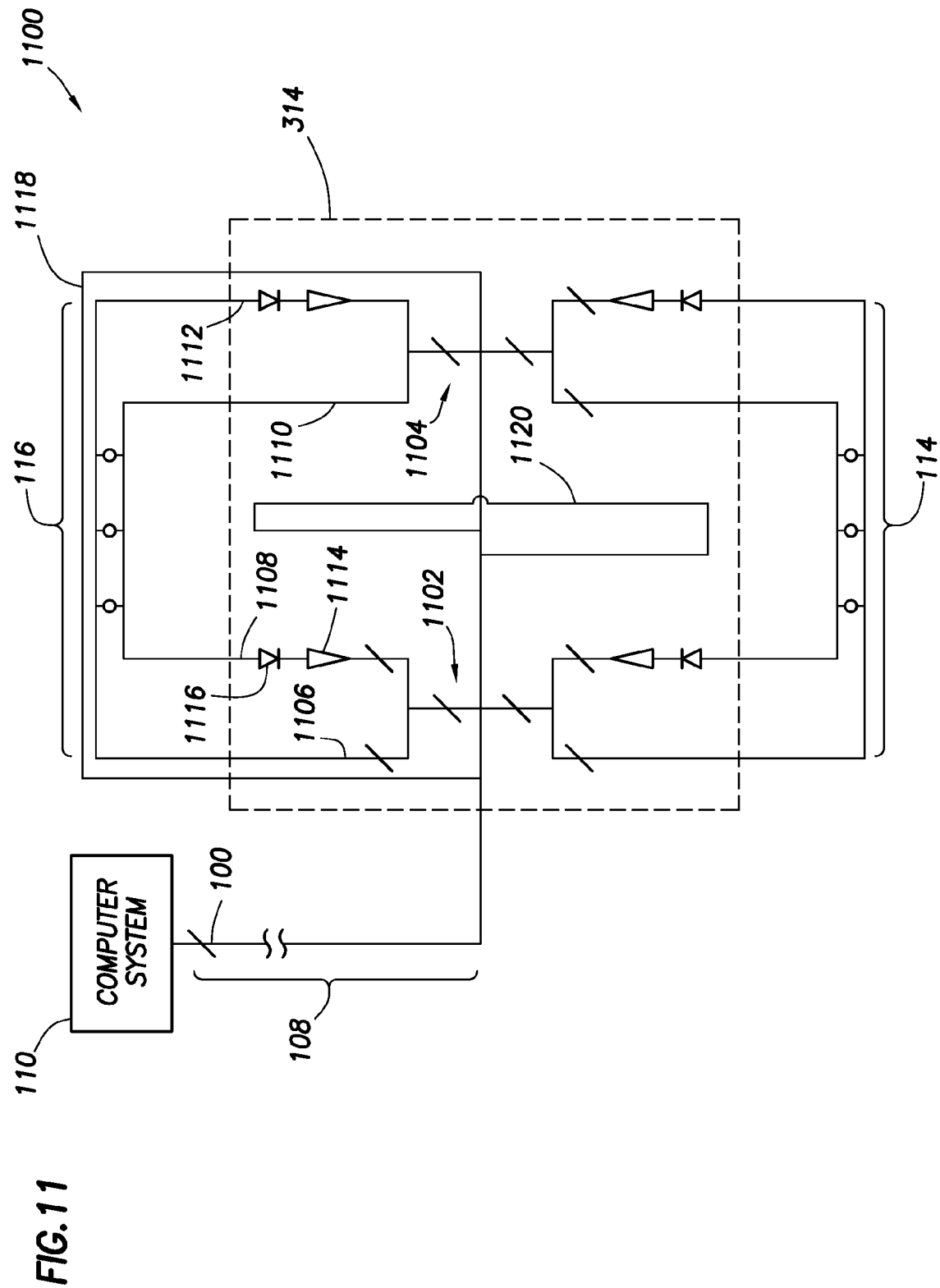
FIG. 11 shows a schematic view of an optical circuit in accordance with at least some embodiments.

FIG. 11 shows an optical circuit diagram in accordance with at least some embodiments. In particular, FIG. 11 shows an example optical circuit 1100 comprising computer system 110 coupled to umbilical cable 108. In an example system the umbilical cable 108 comprises metallic strength members in the form of a wire rope wound into a helix. The wire rope includes, in this example, five tubes with 20 single-mode fiber optic cables disposed within each tube. Thus, the umbilical cable 108 in this example comprises 100 total optical fibers. Different numbers of tubes, and different numbers of fibers, may be used. The umbilical cable 108 couples to the enclosure 314 (shown in dashed lines) where the optical fibers are divided out.

In the example situation of a base unit 106 comprising four termination modules with two termination modules for each sensor cable, the illustrative 100 optical fibers from the umbilical cable may be logically divided into groups. The "/" on each lead represent that a plurality of fibers may be present. Thus, within the enclosure 314 the fibers are logically and physically divided for use by each termination module. FIG. 11 shows four groupings (e.g., grouping 1102 and grouping 1104). Assume for purposes of explanation that grouping of optical fibers 1102 is associated with termination module 124 of FIG. 1, grouping of optical fibers 1104 is associated with termination module 126 of FIG. 1, and the optical fibers of each grouping are coupled to sensor cable 116. In the example situation of a sensor cable coupled as a loop, the 24 fibers in grouping of optical fiber 1102 may be again logically grouped into two groups of 12 fibers, designated outbound fibers 1106 and inbound fibers 1108. That is, light carried to the sensor cable 116 (e.g., to power the sensor devices) is carried on the outbound fibers 1106, and data flowing from the sensor devices to the computer system 110 flows on the inbound fibers 1108.

Still referring to FIG. 11, the grouping of optical fibers 1104 in the example optical circuit work in conjunction with the grouping of optical fibers 1102. That is, grouping of optical fibers 1104 likewise define outbound fibers 1110 and inbound fibers 1112; however, the outbound fibers 1106 are communicatively coupled to the inbound fibers 1112, and the outbound fibers 1110 are communicatively coupled to the inbound fibers 1108. In this way, the sensor devices of the example sensor cable 116 may be powered from either direction, and likewise data may flow to the computer system from either direction. The system thus provides redundancy in the event of fiber breakage. In fact, the sensor cable 116 could be completely severed, and yet the two halves remain independently operational.

Each optical fiber of the sets of inbound fibers may comprise an optical amplifier and an optical gate. Referring to grouping of optical fibers 1102, each fiber of the inbound fibers comprises an optical amplifier 1114 (drawn schematically as an electrical amplifier for convenience) and an optical gate 1116 (drawn schematically as a diode for convenience). FIG. 11 shows only one optical amplifier 1114 and optical gate 1116 for the inbound fibers 1108, but it will be understood that an optical amplifier and optical gate will be present for each optical fiber of the inbound fibers. The optical amplifiers may take any suitable form, such as Erbium doped fiber amplifiers, where the charge light energy (e.g., 1480 nanometers (nm) wavelength light) is provided from the computer system, and the optical amplifiers amplify signals in the 1550 nm range. The example optical gate 116 may be designed to block the 1480 nm wavelength light from entering the sensor cable 116. Although the discussion to this point has been with respect to the optical fibers associated with sensor cable 116, an equivalent discussion applies with respect to example sensor cable 114 shown in FIG. 11.

In some cases, the spare optical fibers are held in reserve, in case of a fiber failure. In other cases, however, the spare fibers may serve other purposes. In the example optical circuit 1100, the spare fibers may be used as pressure insensitive interferometers. For example, one or more of the fibers may run through the sensor cable 116 (such as fiber 1118) and one or more fibers may reside within the enclosure (such as fiber 1120). These fibers are not, in the example embodiments, coupled to sensor devices; rather, optical signals may be passed through these fibers from the computer system 110, and then read by the computer system 110. From the resulting data an indication of noise (i.e., the noise floor) may be determined. It can be assumed that the noise floor measured on the pressure insensitive interferometers is likewise present on the other cables, and various noise compensation schemes implemented based thereon.

Figure 12:
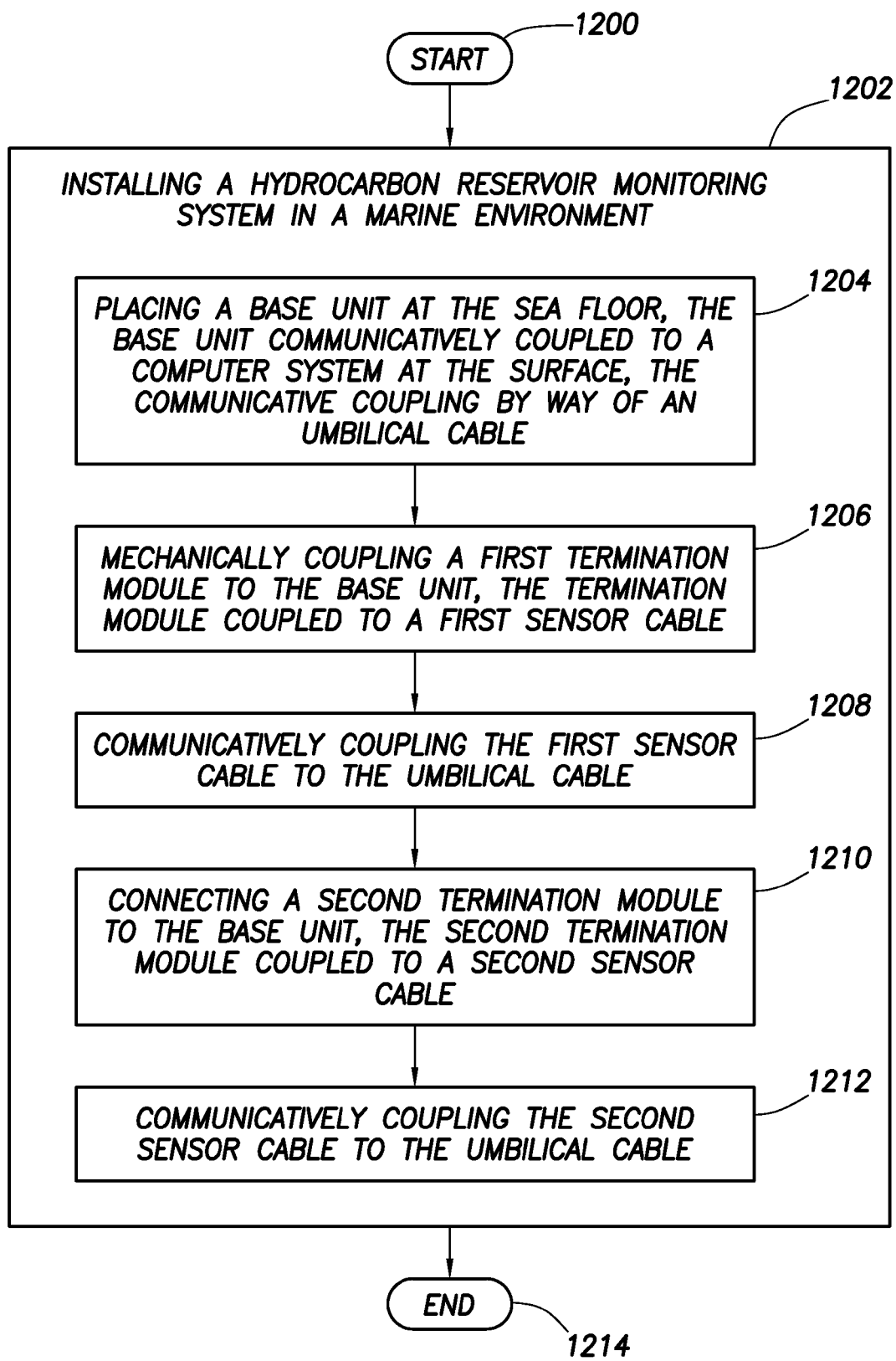
FIG. 12 shows a method in accordance with at least some embodiments.

FIG. 12 shows a method in accordance with at least some embodiments. In particular, the method starts (block 1200) and comprises installing a hydrocarbon reservoir monitoring system in a marine environment (block 1202). Installing the hydrocarbon reservoir monitoring system in the marine environment may be performed by: placing a base unit at the sea floor, the base unit communicatively coupled to a computer system at the surface, the communicative coupling by way of an umbilical cable (block 1204); mechanically coupling a first termination module to the base unit, the termination module coupled to a first sensor cable (block 1206); communicatively coupling the first sensor cable to the umbilical cable (block 1208); connecting a second termination module to the base unit, the second termination module coupled to a second sensor cable (block 1210); and communicatively coupling the second sensor cable to the umbilical cable (block 1212). Thereafter the method ends (block 1214).

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   installing a hydrocarbon reservoir monitoring system in a marine environment by:
      placing a base unit at the sea floor, the base unit communicatively coupled to a computer system at the surface, the communicative coupling by way of an umbilical cable; and then
      mechanically coupling a first termination module to the base unit, the termination module coupled to a first sensor cable; and then
      communicatively coupling the first sensor cable to the umbilical cable by physically moving a releasable coupler.

2. The method of claim 1 further comprising:
   mechanically connecting a second termination module to the base unit, the second termination module coupled to a second sensor cable; and
   communicatively coupling the second sensor cable to the umbilical cable.

3. A method comprising:
   installing a hydrocarbon reservoir monitoring system in a marine environment by:
      placing a base unit at the sea floor, the base unit communicatively coupled to a computer system at the surface, the communicative coupling by way of an umbilical cable;
      mechanically coupling a first termination module to the base unit, the termination module coupled to a first sensor cable, the mechanically coupling by:
         aligning the first termination module with an alignment mechanism of the base unit, the aligning at least in part by an underwater intervention system;
         lowering the first termination module; and
         locking the first termination module in place, the locking at least in part by the underwater intervention system;
      communicatively coupling the first sensor cable to the umbilical cable by the underwater intervention system mating a first connector portion associated with the base unit to a second connector portion associated with the first termination module.

4. The method of claim 3 wherein aligning further comprises aligning an aperture defined in the first termination module with a pin defined on the base unit.

5. The method of claim 3 wherein aligning further comprises aligning an aperture defined in the first termination module with a conical pin defined on the base unit.

6. The method of claim 3 wherein aligning further comprises at least one selected from the group consisting of: aligning by a remotely operated vehicle (ROV); and aligning by a diver.

7. A method comprising:
   installing a hydrocarbon reservoir monitoring system in a marine environment by:
      placing a base unit at the sea floor, the base unit communicatively coupled to a computer system at the surface, the communicative coupling by way of an umbilical cable;
      mechanically coupling a first termination module to the base unit, the termination module coupled to a first sensor cable; and
      communicatively coupling the first sensor cable to the umbilical cable;
      mechanically coupling a second termination module to the base unit, the second termination module coupled to a first end of a second sensor cable;
      communicatively coupling the first end of the second sensor cable to the umbilical cable;
      connecting a third termination module to the base unit, the third termination module coupled to a second end of the second sensor cable; and
      communicatively coupling the second end of the second sensor cable to the umbilical cable.

8. A system comprising:
   a base unit comprising:
      a structure defining a top, a bottom, and a side;
      a plurality of attachment locations defined by the structure;
      an enclosure mechanically coupled to the structure, the enclosure defining an interior volume, and the enclosure water tight;
      optical devices disposed within the enclosure;
      an umbilical cable mechanically coupled to the structure, and the umbilical cable communicatively coupled to the optical devices;
      wherein tension forces carried on the umbilical cable proximate to the base unit are communicated to the structure through the enclosure, and the tension forces are not communicated to the optical devices;
   a first termination module releasably coupled to the base unit at a first attachment location of the plurality of attachment locations, the first termination unit comprising:
      a frame that defines a front and a back;
      a first sensor cable comprising a plurality of seismic measurement devices, the first sensor cable mechanically coupled to the frame of the first termination module and extending away from base unit; and
      a first releasable optical coupler disposed within a primary communicative coupling between the first sensor cable and the optical devices;
      wherein tension forces carried on the first sensor cable proximate the first termination module are communicated to the structure of the base unit through the frame of the first termination module, and the tension forces carried by the first sensor cable are not communicated to the first releasable optical coupler.

9. The system of claim 8 further comprising:
   a second termination module releasably coupled to base unit at a second attachment location of the plurality of attachment locations, the second termination unit comprising:

a frame that defines a front and a back;
a second sensor cable comprising a plurality of seismic measurement devices, the second sensor cable mechanically coupled to the frame of the second termination module and extending away from base unit; and
a second releasable optical coupler disposed within a primary communicative coupling between the second sensor cable and the optical devices;
wherein tension forces carried on second sensor cable proximate the second termination module are communicated to the structure of the base unit through the frame of the first termination module, and the tension forces carried by the second sensor cable are not communicated to the second releasable optical coupler.

10. The system of claim 8 wherein the first attachment location further comprises:
a coarse alignment framework defined by the structure of the base unit, the coarse alignment framework configured to provide coarse alignment of the first termination module with the structure of the base unit during installation in a marine environment; and
a fine alignment mechanism defined on the structure of the base unit, the fine alignment mechanism configured to provide fine alignment of the first termination module with the structure of the base unit during installation in the marine environment.

11. The system of claim 10 wherein the coarse alignment framework further comprises:
a first plane defined by the structure of the base unit on the side; and
a second plane defined by the structure of the base unit on the side, the second plane perpendicular to the first plane.

12. The system of claim 11 wherein the fine alignment mechanism comprises a pin extending from the structure of the base unit, the pin defining a central axis, and the central axis parallel to both the first and second planes.

13. The system of claim 11 wherein the fine alignment mechanism comprises a conical pin extending from the structure of the base unit.

14. The system of claim 8 wherein the first releasable optical coupler further comprises:
a first coupler portion rigidly coupled to the frame of the first termination module and having an optical fiber communicatively coupled to the first sensor cable; and
a second coupler portion coupled to the structure of the base unit by an intermediate communication cable, the second coupler having an optical fiber communicatively coupled to the umbilical cable;
wherein in situations where the first coupler portion is coupled the second coupler portion, the optical fiber of the of the first coupler portion optically couples to the optical fiber of the second coupler portion.

15. The system of claim 8 further comprising a locking mechanism configured to, at least in part, couple the first termination module to the first attachment location.

16. The system of claim 9 further comprising:
a third termination module releasably coupled to the base unit at a third attachment location of the plurality of attachment locations, the third termination module comprising:
a frame that defines a front and a back;
the first sensor cable mechanically coupled to the frame of third termination module on an end of the first sensor cable opposite the first termination module; and
a third releasable optical coupler disposed within a secondary communicative coupling between the first sensor cable and the optical devices;
wherein tension forces carried on first sensor cable proximate the third termination module are communicated to the structure of the base unit through the frame of the third termination module, and the tension forces carried by the first sensor cable are not communicated to the third releasable optical coupler.

17. The system of claim 16 further comprising:
a fourth termination module releasably coupled to the base unit at a fourth attachment location of the plurality of attachment locations, the fourth termination module comprising:
a frame that defines a front and a back;
the second sensor cable mechanically coupled to the frame of fourth termination module on an end of the second sensor cable opposite the second termination module;
a fourth releasable optical coupler disposed within a secondary communicative coupling between the second sensor cable and the optical devices; and
wherein tension forces carried on second sensor cable proximate the fourth termination module are communicated to the structure of the base unit through the frame of the fourth termination module, and the tension forces carried by the second sensor cable are not communicated to the fourth releasable optical coupler.

18. The system of claim 9 further comprising:
a third termination module releasably coupled to the base unit at a third attachment location of the plurality of attachment locations, the third termination module coupled to the first sensor cable, and wherein if the first sensor cable is severed, a first severed portion of the first sensor cable coupled to the first termination module is operable through the first termination module, and a second severed portion of the first sensor cable coupled to the second termination module is operable through the second termination module; and
a fourth termination module releasably coupled to the base unit at a fourth attachment location of the plurality of attachment locations, the fourth termination module coupled to the second sensor cable, and wherein if the second sensor cable is severed, a first severed portion of the second sensor cable coupled to the second termination module is operable through the second termination module, and a second severed portion of the second sensor cable coupled to the fourth termination module is operable through the second termination module.

19. The system of claim 9 further comprising:
a third termination module releasably coupled to the base unit at a third attachment location of the plurality of attachment locations, the fourth termination module comprising:
a frame that defines a front and a back;
a third sensor cable comprising a plurality of seismic measurement devices, the third sensor cable mechanically coupled to the frame of third termination module and extending away from base unit;
a third releasable optical coupler disposed within a primary communicative coupling between the third sensor cable and the optical devices;
wherein tension forces carried on third sensor cable proximate the third termination unit are communicated to the structure of the base unit through the frame of the third termination module, and the tension forces carried by the third sensor cable are not communicated to the third releasable optical coupler;

a fourth termination module releasably coupled to the base unit at a fourth attachment location of the plurality of attachment locations, the fourth termination module comprising:
- a frame that defines a front and a back;
- a fourth sensor cable comprising a plurality of seismic measurement devices, the fourth sensor cable mechanically coupled to the frame of fourth termination module and extending away from base unit;
- a fourth releasable optical coupler disposed within a primary communicative coupling between the fourth sensor cable and the optical devices; and
- wherein tension forces carried on fourth sensor cable proximate the fourth termination module are communicated to the structure of the base unit through the frame of the fourth termination module, and the tension forces carried by the fourth sensor cable are not communicated to the fourth releasable optical coupler.

20. The system of claim 9 wherein the first sensor cable and second sensor cable are the same cable coupled on a first end to the first termination module and coupled on a second end to the second termination module.

21. A system comprising:
- means for distributing communicative channels from an umbilical cable that extends from the surface, the means for distributing proximate the sea floor;
- first means for releasable mechanically coupling a first sensor cable to the means for distributing, the first means for releasable mechanically coupling coupled to the means for distributing;
- a means for communicatively coupling the first sensor cable to the umbilical cable, the means for communicatively coupling distinct from the first means for releasable mechanically coupling;
- second means for releasable mechanically coupling a second sensor cable to the means for distributing, the second means for releasable mechanically coupling coupled to the means for distributing; and
- a means for communicatively coupling the second sensor cable to the umbilical cable, the means for communicatively coupling the second sensor cable distinct from the second means for releasable mechanically coupling.

22. The system of claim 21 wherein the means for distributing further comprising means for containing optical devices and for transferring tension forces on the umbilical cable to a structure of the means for distributing such that substantially no force coupled to the structure is applied to the optical devices.

23. The system of claim 21 wherein the means for distributing further comprises means for accepting the first means for releasable coupling in an abutting relationship with the means for distributing.

24. The system of claim 21 wherein the first means for releasable mechanically coupling further comprises means for mechanically and optically coupling to the means for communicatively coupling the first sensor cable to the umbilical cable.

25. The system of claim 21 wherein the first sensor cable and the second sensor cable are the same sensor cable.

26. A system comprising:
- means for distributing communicative channels from an umbilical cable that extends from the surface, the means for distributing proximate the sea floor;
- first means for releasably coupling a first sensor cable to the means for distributing, the first means for releasably coupling coupled to the means for distributing; and
- second means for releasably coupling a second sensor cable to the means for distributing, the second means for releasably coupling coupled to the means for distributing;
- the means for distributing further comprises a means for accepting the first means for releasable coupling in an abutting relationship with the means for distributing, the means for accepting comprises
  - means for rough alignment of the first means for releasable coupling; and
  - means for fine alignment of the first means for releasable coupling.

* * * * *